United States Patent [19]

Reimer et al.

[11] Patent Number: 4,704,696
[45] Date of Patent: Nov. 3, 1987

[54] METHOD AND APPARATUS FOR VOICE CONTROL OF A COMPUTER

[75] Inventors: Jay B. Reimer, Lubbock, Tex.; Robert D. Doiron, Reading, Mass.

[73] Assignee: Texas Instruments Incorporated, Dallas, Tex.

[21] Appl. No.: 574,117

[22] Filed: Jan. 26, 1984

[51] Int. Cl.⁴ .............................................. G10L 5/00
[52] U.S. Cl. .................................. 364/513.5; 381/43; 364/521
[58] Field of Search ................................. 381/36–39, 381/41–43, 45, 49, 50, 110; 364/513.5, 188, 190, 410, 521

[56] References Cited

U.S. PATENT DOCUMENTS

| | | | |
|---|---|---|---|
| Re. 32,172 | 6/1986 | Johnston et al. | 381/46 |
| 3,215,934 | 11/1965 | Sallen | 381/41 |
| 3,278,685 | 10/1966 | Harper | 381/41 |
| 3,394,309 | 7/1968 | Dusheck | 381/41 |
| 3,742,143 | 6/1973 | Awipi | 381/41 |
| 3,909,532 | 9/1975 | Rabiner et al. | 381/41 |
| 3,940,565 | 2/1976 | Lindenburg | 381/43 |
| 4,305,131 | 12/1981 | Best | 381/43 |
| 4,333,152 | 6/1982 | Best | 381/36 |
| 4,340,797 | 7/1982 | Takano et al. | 367/198 |
| 4,408,096 | 10/1983 | Washizuka et al. | 381/110 |
| 4,445,187 | 4/1984 | Best | 381/43 |
| 4,472,617 | 9/1984 | Ueda et al. | 381/43 |
| 4,525,793 | 6/1985 | Stackhouse | 364/513.5 |
| 4,569,026 | 2/1986 | Best | 381/43 |
| 4,573,187 | 2/1986 | Bui et al. | 381/35 |

*Primary Examiner*—E. S. Matt Kemeny
*Attorney, Agent, or Firm*—William E. Hiller; N. Rhys Merrett; Melvin Sharp

[57] ABSTRACT

A voice control system for controlling execution of a computer program includes a microphone (10) operative to receive voice commands having the output thereof connected to a clipping circuit (12) which amplifies and clips the microphone output to generate a zero-crossing signal. The output of circuit (12) is connected to a microprocessor (14) which on detecting speech input interrupts program execution in a CPU (15) and "freezes" display device (16) on which the game is displayed. Microprocessor (14) then processes the input signal to recognize the voice command by determining the relative frequency content of discrete portions of the command. Once it has recognized the command, microprocessor (14) prompts the CPU (15) to execute the command and resume execution of the game program at the point of interrupt. By suspending the progress of the game during the speech input and recognition interval, the voice control system minimizes the time-constraint problems associated with voice input.

6 Claims, 6 Drawing Figures

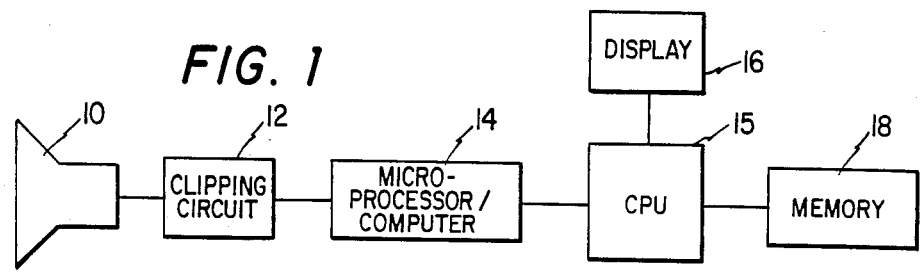
FIG. 1
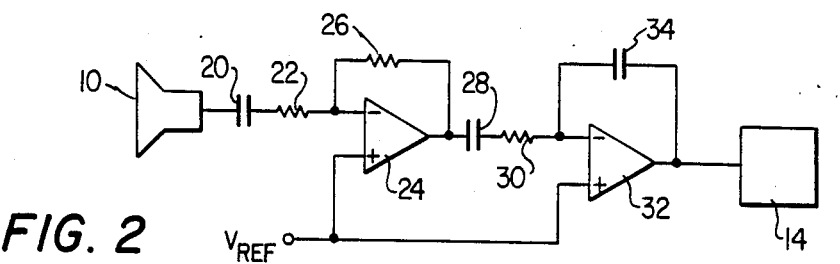
FIG. 2
|  | FREQUENCY CONTENT | |
|---|---|---|
| LEFT | L | H |
| RIGHT | L | L |
| FIRE | H | L |
| CEASE | H | H |
FIG. 3
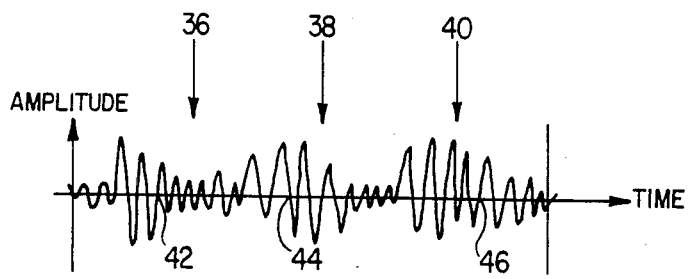
FIG. 4

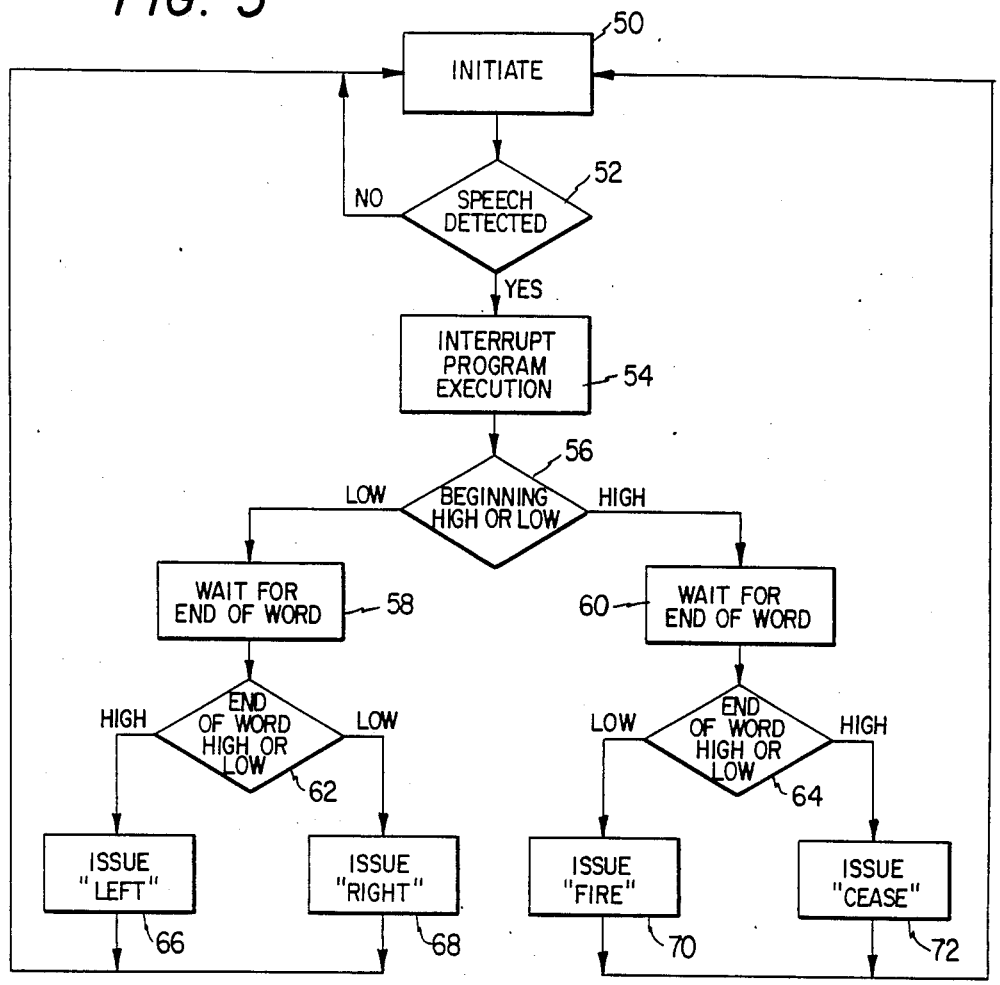
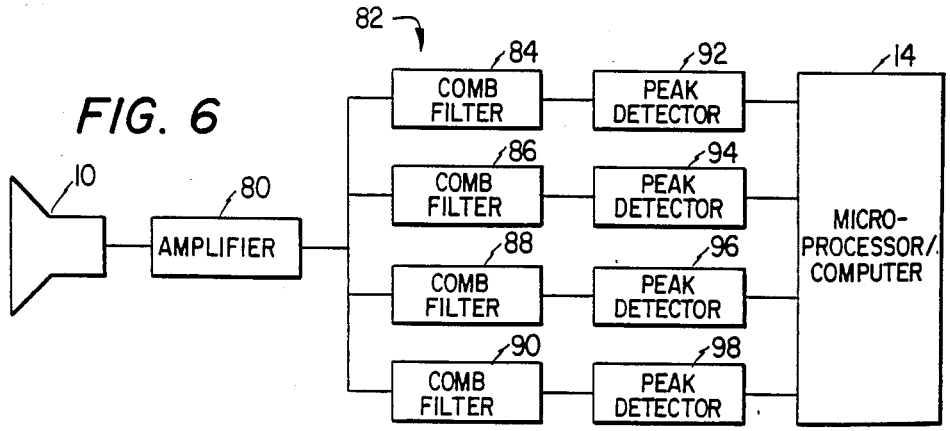

METHOD AND APPARATUS FOR VOICE CONTROL OF A COMPUTER

TECHNICAL FIELD

This invention relates to voice recognition systems generally and more specifically to a system wherein voice commands are used to control the execution of a program, such as a video game, operating in real time in a computer.

BACKGROUND OF THE INVENTION

Play in video games has conventionally proceeded in accordance with commands received from hand-manipulated controls or joysticks or from a computer keyboard. Voice input has been heretofore viewed as an unacceptable substitute for such hand-operated devices because of the complexity involved and because of the time constraints associated with issuing and recognizing spoken commands. By way of comparison, the time required for joystick manipulation is normally in the range of 10–100 milliseconds, or essentially a human reaction/decision time limitation. Voice input requires that same reaction/decision time, plus an additional time interval for speech input and recognition. Voice input time may then total from 100–500 milliseconds, during which time considerable changes in the game situation will typically have occurred. A player's ability to issue voice commands quickly enough for effective play is therefore severely limited.

The present invention obviates the time constraint problems attendant with the use of voice input by providing an interrupt of the game action during the speech input and recognition interval. The present invention thus provides a system in which execution of the game program may be readily controlled in accordance with voice commands.

SUMMARY OF THE INVENTION

The present invention described and disclosed herein comprises a method and apparatus for controlling execution of a real time computer program, such as a video game, through use of a vocabulary of voice commands, e.g. "left", "right", "fire" and "cease", which correspond to functions normally controlled by a joystick or the like. The apparatus includes circuitry for sensing voice command signals and a microprocessor connected to the circuitry and responsive to the sensing of voice command signals to interrupt execution of the program. The microprocessor allows resumption of program execution only after it has "recognized" the voice command and performed the functions associated therewith.

More specifically, the apparatus includes a microphone operative to receive voice commands. The output of the microphone is connected to a clipping circuit which amplifies and "clips" the microphone output to generate a signal waveform having relatively sharp transitions between positive and negative values (i.e., a zero-crossing signal). The circuit output is connected to a microprocessor having a memory associated therewith and a program contained with the memory to recognize and respond to the command vocabulary. The microprocessor may be attached to a central processing unit (CPU) with program memory and display devices for exhibiting the play of the game.

The signal input to the microprocessor is received by an "event counter" which detects signal transitions and maintains a count of zero-crossings (i.e., the number of times the signal passes through a value of zero). The microprocessor recognizes the voice command by determining the frequency content (as measured by the number of zero-crossings) of discrete portions of the command, discriminating those frequencies between a plurality of discrete levels, and comparing those frequency levels with frequency patterns or reference templates stored in memory and corresponding to the allowable commands. Once the command has been recognized the microprocessor "executes" the command, i.e., initiates appropriate movement of the playing piece or figure involved in play of the video game on the display screen.

In an alternative embodiment, the microphone output is connected to an amplifier circuit having its output connected to a filter bank having narrow bandpass filters spaced across the frequency spectrum to monitor the amount of energy in a plurality of preselected frequency ranges versus time. The output of each filter is input to a peak detector, the output of which is connected to an input line of the microprocessor. The microprocessor determines the frequency levels of discrete portions of the command based upon the digital output of the peak detectors and compares those levels as described above with the reference templates to recognize the voice command.

Because execution of the game program is interrupted at the instance speech is detected and is resumed only after the voice command has been recognized and executed, the voice input player is afforded the same timing advantages associated with hand-manipulated controls.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a block diagram of the voice control circuitry in accordance with an embodiment of the present invention;

FIG. 2 illustrates a schematic diagram of the clipping circuit;

FIG. 3 illustrates references templates for a command vocabulary;

FIG. 4 illustrates a signal waveform representative of a voice command;

FIG. 5 illustrates a flow chart of the recognition program; and

FIG. 6 illustrates a block diagram of the voice control circuitry in accordance with an alternative embodiment.

DETAILED DESCRIPTION OF THE INVENTION

Referring to FIG. 1, there is illustrated a block diagram for an exemplary embodiment of the present invention. Voice commands are received at a microphone 10 operational in the audio range of voice. Microphone 10 is an active device connected to a positive voltage supply and can be a field effect transistor (FET) type device that derives a relatively flat response over audio frequencies in the voice range. The output of microphone 10 is connected to a clipping circuit 12 which amplifies and clips the microphone output to generate a zero-crossing signal. The amplifier gain should be high enough to allow maximum sensitivity, particularly for high frequencies, but not so high that instability and oscillation results.

The output of clipping circuit 12 is input to a microprocessor 14 to which a host central processing unit (CPU) 15 with a display device 16 for exhibiting game program execution is attached. The system may be used to play various types of computer games in which a playing piece or figure is moved, and in educational games or tests which involve the moving of a cursor or the like. CPU 15 has a memory 18 associated therewith and may be, for example, a TMS 9900 microprocessor and the microprocessor 14 may be a TMS 2300 microprocessor, both available from Texas Instruments, Inc., Dallas, Tex. On detecting voice input, microprocessor 14 interrupts execution of the game program thus "freezing" the screen of display device 16. Microprocessor 14 then processes the input signals to "recognize" the voice command. Upon recognizing the command, microprocessor 14 supplies a command to CPU 15 which then executes the command, i.e., initiates appropriate movement of the playing piece, figure, cursor or the like, and resumes game program execution at the point of interrupt.

FIG. 2 illustrates a suitable arrangement for clipping circuit 12 and shows the interconnections between circuit 12, microphone 10 and microprocessor 14. The output of microphone 10 is connected to the input of a capacitor 20. The output of capacitor 20 is in turn connected to the input of a resistor 22, the output of which is connected to the negative input of an operational amplifier 24. A feedback resistor 26 has one end thereof connected to the output of operational amplifier 24 and the other end thereof connected to its negative input. The positive input of operational amplifier 24 is connected to a reference or centering voltage. The values of feedback resistor 26 and resistor 22 provide a ratio of approximately 300 resulting in a very high gain for operational amplifier 24.

The output of operational amplifier 24 is connected to the input of a capacitor 28, the output of which is connected to the input of a series resistor 30. The output of series resistor 30 is connected to the negative input of an operational amplifier 32. A feedback capacitor 34 has one end thereof connected to the output of operational amplifier 30 and the other end thereof connected to the negative input of operational amplifier 32. The positive input of operational amplifier 32 is connected to the reference voltage to which the positive input of operational amplifier 24 is also connected. Operational amplifier 32 is configured as an integrator and the output thereof is connected to microprocessor 14.

When a signal is coupled across the capacitor 20, the operational amplifier 24 is functional as a high gain stage of amplification with the output thereof centered at the reference voltage. For large signals such as loud voice, the operational amplifier 24 will "clip" the signal. During silence, however, a noise signal is present which, as will be described hereinbelow, is accounted for in software programming. The operational amplifier 32 then receives the A-C coupled signal from the output of the operational amplifier 24 and amplifies it. The operational amplifier 32 is essentially an infinite gain amplification stage with the capacitor 34 providing some feedback. The amplifier resulting from cascading the operational amplifiers 24 and 32 produces an amplified signal for input to the microprocessor 14.

The output of operational amplifier 32 is connected to the event counter input of microprocessor 14. The event counter may be implemented as either hardware or software and is operative to detect signal transitions by sensing the logic state of the input signal and to maintain a count of the zero-crossings during a preselected time interval.

Once an input signal is received from circuit 12, microprocessor 14 initiates execution of the recognition program to recognize the voice command. That program is designed to recognize a command vocabulary corresponding to the allowable joystick functions, by determining the relative frequency content of each command. As described in greater detail hereinafter, the microprocessor 14 samples the input signal in predetermined time intervals (i.e., frames), and determines the number of zero-crossings occurring therein. The number of zero-crossings is thereafter used as a measure of the frequency content of the frame which is characterized based on the number of zero-crossings as, for example, high, medium, low. The microprocessor 14 divides each voice command into a plurality of components consisting of a number of consecutive frames. The frequency content of each component is, in like manner, characterized as high, medium, or low based on the frequency characterization of its constituent frames.

FIG. 3 illustrates a typical command vocabulary consisting of the commands "left", "right", "fire", and "cease". As shown in FIG. 3, if each of the commands is partitioned into a first and second component and frequency discriminated between a high level and a low level, the four commands may be readily distinguished by the relative frequency content of the associated components. "Left", for example, is characterized as "LH" indicating a low relative frequency content in the first portion and a high relative frequency in the second portion of the word. "Right" is characterized "LL", "fire" as "HL" and "cease" as "HH". Though the commands of FIG. 3 are identified by distinguishing between a low frequency level and a high frequency level, it should be appreciated that the size of the command vocabulary could be enlarged, in accordance with the present recognition scheme, by differentiating between more than two frequency levels. For example, by discriminating between low, medium, and high frequency levels, it is possible to recognize a vocabulary of nine commands having frequency contents corresponding to the frequency patterns: LL, LM, LH, ML, MM, MH, HL, HM and HH.

Another aspect of the invention encompasses increasing the vocabulary size of the system by partitioning the commands into more than two components. Partitioning each command into three components would, for example, permit recognition of a vocabulary of eight words corresponding to the frequency patterns, LLL, LHL, LLH, LHH, HHH, HLL, HLH, HHL. The two proposed approaches, of course, need not be mutually exclusive but may be appropriately combined to enlarge the command vocabulary. The only limitation on the size of the vocabulary is that the pattern of frequency levels of each of the commands of the vocabulary must be unique. As will become apparent from the discussion hereinafter of the recognition program, voice commands should normally be issued one at a time and be preceded and followed by pauses to permit easy detection of word boundaries.

Referring now to the recognition scheme, the recognition program first determines whether speech has been detected by sampling the signal input in selected time intervals or frames, e.g., every 25 milliseconds. FIG. 4 illustrates a signal waveform representative of a voice command. The signal is sampled at intervals designated 36, 38, and 40. Points 42, 44, and 46 at which the signal passes through the value of zero are "zero-crossings". The recognition program samples the signal input until a predetermined number of consecutive non-zero zero-crossing frames have been received, whereupon it interrupts execution of the game program. The delay preliminary to speech detection is provided to ensure that the effects of spurious signals or noise are eliminated.

Once speech is detected, the input signal is sampled every frame to obtain a relative frequency reading at that frame proportional to the number of zero-crossings occurring within that time interval as measured by the event counter. That frequency reading is discriminated between a plurality of frequency levels. Frames having a number of zero-crossings falling between a first and second threshold are, for example, characterized as low frequency, between the second threshold and a third threshold as medium frequency, etc. The frames are accumulated at selected intervals after a specified number of frames have been sampled, at which intervals the frequency level of that portion of the command is determined based on the frequency level of its constituent frames.

Sampling continues until the end of speech is detected by receipt of some predetermined number of consecutive frames of silence (i.e., frames having no zero-crossings). It is desirable to detect the end of speech so that the end of the current voice command is not detected as a new command. Once the end of speech is detected, the frequency levels associated with the command are matched against a plurality of frequency patterns or reference templates stored in memory 18 and corresponding to the allowable commands. FIG. 3, described above, illustrates reference templates for a command vocabulary. Once a match is found, the "recognized" command is executed and game program execution is resumed at the point of interrupt.

A flow chart of the recognition algorithm tailored to recognize the command vocabulary of FIG. 3 is illustrated in FIG. 5. THe commands are partitioned into two intervals, beginning of word and end of word and the frequency level of each interval discriminated between a high level and a low level.

Referring to FIG. 5, an input signal is sampled at 50 in frames of approximately 25 milliseconds until speech is detected at 52 by receipt of two consecutive frames of non-zero zero-crossings, whereupon execution of the game program is interrupted at 54. Sampling then continues until either a high frequency frame (i.e., a frame having a number of zero-crossings which exceeds a preselected threshold) is detected or four low frequency frames are detected. That frame or collection of frames is treated as a first or "beginning" portion of the word and is characterized as high frequency or low frequency at 56 depending upon whether a high frequency frame was detected. The program then "waits" an additional six frames at 58 and 60. The first non-zero zero-crossing frame thereafter marks the beginning of the second or "ending" portion of the word and its frequency determines the frequency level (i.e., high or low) at 62 and 64 of the second word portion. Sampling continues until the end of speech is detected by receipt of five consecutive frames of zero zero-crossings at which point the command is "recognized" by the frequency level of the constituent portions and the appropriate command issued at 66, 68, 70, and 72.

A program listing, with comments, implementing the flow chart of FIG. 5 is set forth in Table 1 below. The assembly language program is particularly adapted for use with a TMS 2300 microprocessor, and is written in accordance with the TMS 1000 Series Programmers Reference Manual available from Texas Instruments, Inc.

TABLE 1

```
JOYSTK     ASSEMBLER FOR   2100   CHIP VERS 00.10

STMT    PC  CODE PLOC
 0001
 0002                          TITLE        JOYSTK
 0003                          OPTION       ROM
 0003 *******************************************************
 0004 *  THIS PROGRAM RECOGNIZES 'LEFT', 'RIGHT', AND 'FIRE'
 0005 *  USING A FINITE STATE MACHINE ALGORITHM.
 0006 *******************************************************
 0007 *
 0008 *           INTERRUPT        M(7,2)
 0009 *           COUNT
 0010 *           COUNTER MSB      M(7,1)
 0011 *           COUNTER LSB      M(7,0)
 0012 *           THRESHOLD        M(7,15)
 0013 *           STATE            M(7,3)
 0014 *           LAST KEY         M(7,4)
 0015 *
 0016 *  SPEECH PARAMETERS ARE IN M(6,X)
 0017 *
 0018 *           CNTR VALUE       M(6,0)
 0019 *           THRESHOLD        M(6,1)
 0020 *           TBEGIN           M(6,2)
 0021 *           TWAIT            M(6,3)
```

```
0022 *
0023        0000       COUNTER      EQU    0
0024        0001       THRSHLD      EQU    1
0025        0002       TBEGIN       EQU    2
0026        0003       TWAIT        EQU    3
0027        0000       MSB          EQU    0
0028 *
0029 * COUNTER INTERRUPT
0030 0000 002F 0001    RESET        LDX    7
0031 0001 0044 0002                 TCY    2
0032 0003 003E 0003                 IMAC
0033 0007 0027 0004                 TAM
0034 * INCREMENTS M(7,2) - INTERRUPT COUNT
0035 000F 000F 0005                 RETN
JOYSTK    ASSEMBLER FOR  2100  CHIP VERS 00.10

STMT  PC  CODE PLOC
0049                                PAGE
0050             0001  GETPARAM     EQU    $
0051 0000 002B 0001                 LDX    6
0052 0001 0040 0002                 TCY    0
0053 0003 000D 0003                 SETR          R16 SO J TO A
0054 0007 0008 0004                 TKA           GET J INPUTS
0055 000F 0020 0005                 TAY
0056 001F 005F 0006                 YNEC   15
0057 003F 00AD 0007                 BR     LOAD
0058             0008  DEFAULT      EQU    $
0059 003E 0040 0008                 TCY    0
0060 003D 0061 0009                 TCMIY  8      COUNTER LSB
0061 003B 0040 0010                 TCY    0
0062 0037 0021 0011                 TMA
0063 002F 000A 0012                 TDO
0064 001E 000B 0013                 COMC
0065 003C 001E 0014                 CALLL  LDELAY
     0039 00FD 0015
0066 0033 0048 0016                 TCY    1
0067 0027 0064 0017                 TCMIY  2      THRESHOLD
0068 000E 0048 0018                 TCY    1
0069 001D 0021 0019                 TMA
0070 003A 000A 0020                 TDO
0071 0035 000B 0021                 COMC
0072 002B 001E 0022                 CALLL  LDELAY
     0016 00FD 0023
0073 002C 0044 0024                 TCY    2
0074 0018 0062 0025                 TCMIY  4      TBEGIN
0075 0030 0044 0026                 TCY    2
0076 0021 0021 0027                 TMA
0077 0002 000A 0028                 TDO
0078 0005 000B 0029                 COMC
0079 000B 001E 0030                 CALLL  LDELAY
     0017 00FD 0031
0080 002E 004C 0032                 TCY    3
0081 001C 0066 0033                 TCMIY  6      TWAIT
0082 0038 004C 0034                 TCY    3
0083 0031 0021 0035                 TMA
0084 0023 000A 0036                 TDO
0085 0006 000B 0037                 COMC
0086 000D 001E 0038                 CALLL  LDELAY
     001B 00FD 0039
0087 0036 000F 0040                 RETN
0088             0041  LOAD         EQU    $
0089 002D 000A 0041                 TDO           OUTPUT TO DISPLAY
0090 001A 000B 0042                 COMC
```

```
0091 0034 001E 0043            CALLL    LDELAY    LDELAY DESTROYS
     0029 00FD 0044
0092 * PARAMTER SELECT IN A              Y AND A
0093 0012 0008 0045            TKA                GET J INPUTS
0094 0024 002B 0046            LDX      6
0095 0008 0040 0047            TCY      0
0096 0011 000C 0048            RSTR               SELECT K INPUTS
0097 0022 0020 0049            TAY                STORE IN Y
0098 * PUT SELECT IN Y
0099 0004 0008 0050            TKA                GET K INPUTS
0100 * GET PARAMETER VALUE
0101 0009 0027 0051            TAM
0102 * AND STORE IT
0103 0013 000A 0052            TDO                DISPLAY
STMT  PC   CODE PLOC
0104 0026 000B 0053            COMC
0105 000C 001E 0054            CALLL    LDELAY
     0019 00FD 0055
0106 0032 000F 0056            RETN
JOYSTK     ASSEMBLER FOR 2100 CHIP VERS 00.10

STMT  PC   CODE PLOC
0107                            PAGE
0108           0001  INIT       EQU      $
0109 0000 0017 0001            CALLL    GETPARAM
     0001 00C0 0002
0110 0003 0028 0003            LDX      0
0111 0007 004F 0004            TCY      15
0112 000F 000C 0005            RSTR
0113 * DISABLE EXTERNAL INTERRUPT - R15
0114 001F 002B 0006            LDX      6
0115 003F 0040 0007            TCY      0
0116 003E 0021 0008            TMA                GET M(6,0)
                                                  COUNTER LSB
0117 003D 002F 0009            LDX      7
0118 003B 0027 0010            TAM                PUT AT M(7,0)
                                                  FOR EASY LOAD
0119 0037 0048 0011            TCY      1
0120 002F 0060 0012            TCMIY    MSB       M(7,1)=MSB
0121 * INITIALIZES M(7,0) AND M(7,1) WITH INITIAL COUNTER VALUE
0122 001E 002B 0013            LDX      6
0123 003C 0048 0014            TCY      1
0124 0039 0021 0015            TMA                GET M(6,1)
                                                  THRESHOLD
0125 0033 002F 0016            LDX      7
0126 0027 004F 0017            TCY      15
0127 000E 0027 0018            TAM                PUT AT M(7,15)
                                                  FOR EASY
0128 *                                   THRESHOLD COMPARE
0129 001D 0048 0019            TCY      1
0130 003A 000D 0020            SETR
0131 * SETS R17 SO IVR CAN BE LOADED
0132 0035 0021 0021            TMA
0133 * TRANSFERS M(7,1) TO MSB OF IVR
0134 002B 0040 0022            TCY      0
0135 0016 0021 0023            TMA
0136 * TRANSFERS M(7,0) TO LSB OF IVR
0137 002C 0048 0024            TCY      1
0138 0018 000C 0025            RSTR
0139 * RESET R17 - IVR LOAD ENABLE
0140 0030 0044 0026            TCY      2
0141 0021 000D 0027            SETR
```

```
0142 *  SELECT EVENT COUNTER MODE - R18
0143 0002 004C 0028             TCY     3
0144 0005 000D 0029             SETR
0145 *  SELECT A1 INPUT TO A/D
0146 000B 004E 0030             TCY     7
0147 0017 000D 0031             SETR
0148 *  STARTS COUNTER
0149 002E 0041 0032             TCY     8
0150 001C 000D 0033             SETR
0151 *  ENABLE INTERRUPTS
0152 0038 000B 0034             COMC
0153 0031 0010 0035             BL      SILENCE0
     0023 0080 0036
```

JOYSTK      ASSEMBLER FOR 2100 CHIP VERS 00.10

```
STMT  PC   CODE PLOC
0154                              CHAPTER 1
0155           0001    SILENCE0   EQU     $
0156 0000 002F 0001               LDX     7
0157 0001 0016 0002               CALLL   FRAME
     0003 00C0 0003
0158 0007 0050 0004               YNEC    0
0159 000F 00BF 0005               BR      SILENCE1
0160 001F 0080 0006               BR      SILENCE0
0161 003F 0016 0007    SILENCE1   CALLL   FRAME
     003E 00C0 0008
0162 003D 0050 0009               YNEC    0
0163 003B 00AF 0010               BR      WORD
0164 0037 0080 0011               BR      SILENCE0
0165 *  PROVIDES 2 FRAMES OF NON-ZERO ZCR BUFFERING
0166           0012    WORD       EQU     $
0167 002F 007F 0012               CLA
0168 001E 004C 0013               TCY     3
0169 003C 0027 0014               TAM             CLEAR STATE
                                                  COUNTER M(7,3)
0170           0015    BEGIN      EQU     $
0171 0039 002F 0015               LDX     7
0172 0033 0016 0016               CALLL   FRAME   ZCR IN A AND Y
     0027 00C0 0017
0173 000E 0050 0018               YNEC    0
0174 001D 00AC 0019               BR      POSZCR
0175 *  FOLLOWING 3 LINES ADDED 9/14/82 BDD
0176 003A 0042 0020               TCY     4       GET M(7,4)
0177 0035 0021 0021               TMA
0178 002B 000A 0022               TDO             RESTORE
                                                  PREVIOUS KEY
0179 *
0180 0016 00BF 0023               BR      SILENCE1
0181 *
0182           0024    POSZCR     EQU     $
0183 002C 007F 0024               CLA             RELEASE PREVIOUS
0184 0018 0077 0025               DAN
0185 0030 000A 0026               TDO             KEY
0186 0021 0023 0027               TYA             RESTORE A
0187 0002 004F 0028               TCY     15
0188 0005 0001 0029               ALEM
0189 000B 009C 0030               BR      LOW
0190 0017 0014 0031               BL      HBEGIN
     002E 0080 0032
0191 *  BRANCHES TO HBEGIN IF HIGH ZCR SEEN
0192           0033    LOW        EQU     $
0193 001C 004C 0033               TCY     3
0194 0038 003E 0034               IMAC            INCREMENT STATE  M(7,3)
```

```
0195 0031 0027 0035          TAM                ALSO IN A
0196 0023 002B 0036          LDX      6
0197 0006 0044 0037          TCY      2         TBEGIN IN M(6,2)
0198 000D 0001 0038          ALEM
0199 001B 00B9 0039          BR       BEGIN     JUMP IF STATE
                                                 < TBEGIN
0200 *   FALLS THROUGH IF BEGINNING OF WORD HAS PASSED
0201 *   WORD CANNOT BE HIGHLOW
0202 0036 007F 0040          CLA
0203 002D 002F 0041          LDX      7
0204 001A 004C 0042          TCY      3
0205 0034 0027 0043          TAM                CLEAR STATE
0206 0029 0018 0044          BL       WAIT      GO TO NEXT MODE
     0012 0080 0045
0207                 PAGE
0208           0001  WAIT    EQU      $
0209 0000 002F 0001          LDX      7
0210 0001 0016 0002          CALLL    FRAME
     0003 00C0 0003
0211 0007 004C 0004          TCY      3
0212 000F 003E 0005          IMAC
0213 001F 0027 0006          TAM                INCREMENT STATE
0214 003F 002B 0007          LDX      6
0215 003E 004C 0008          TCY      3
0216 003D 0001 0009          ALEM               STATE < TWAIT
0217 003B 0080 0010          BR       WAIT
0218 *
0219           0011  HEND    EQU      $
0220 0037 002F 0011          LDX      7
0221 002F 0016 0012          CALLL    FRAME
     001E 00C0 0013
0222 003C 0050 0014          YNEC     0
0223 0039 00A4 0015          BR       CHECK
0224 0033 0016 0016  HEND1   CALLL    FRAME
     0027 00C0 0017
0225 000E 0050 0018          YNEC     0
0226 001D 00A4 0019          BR       CHECK
0227 003A 0016 0020  HEND2   CALLL    FRAME
     0035 00C0 0021
0228 002B 0050 0022          YNEC     0
0229 0016 00A4 0023          BR       CHECK
0230 002C 0016 0024  HEND3   CALLL    FRAME
     0018 00C0 0025
0231 0030 0050 0026          YNEC     0
0232 0021 00A4 0027          BR       CHECK
0233 0002 0016 0028  HEND4   CALLL    FRAME
     0005 00C0 0029
0234 000B 0050 0030          YNEC     0
0235 0017 00A4 0031          BR       CHECK
0236 002E 0016 0032  HEND5   CALLL    FRAME
     001C 00C0 0033
0237 0038 0050 0034          YNEC     0
0238 0031 00A4 0035          BR       CHECK
0239 0023 0016 0036  HEND6   CALLL    FRAME
     0006 00C0 0037
0240 000D 0050 0038          YNEC     0
0241 001B 00A4 0039          BR       CHECK
0242 0036 0016 0040  HEND7   CALLL    FRAME
     002D 00C0 0041
0243 001A 0050 0042          YNEC     0
0244 0034 00A4 0043          BR       CHECK
0245 *   NO HIGH ZCR SEEN, 8 CONSECUTIVE 0 ZCR FRAMES
```

```
0246 0029 001C 0044              BL       LOWLOW
     0012 0080 0045
0247           0046    CHECK     EQU      $
0248 0024 004F 0046              TCY      15
0249 0008 0001 0047              ALEM
0250 0011 00B7 0048              BR       HEND
0251 0022 0012 0049              BL       LOWHIGH
     0004 0030 0050
0252                   PAGE
0253           0001    HBEGIN    EQU      $
0254 0000 0048 0001              TCY      1         ISSUE 'SHOOT'
0255 0001 0023 0002              TYA                AS SOON AS
                                                    BEGINNING
0256 *                 TDO                'S' IS HEARD
0257 *
0258 *   MODIFICATION HERE TO PREVENT ISSUE OF 'SHOOT'
0259 *   INSTEAD LEAVE 'F' WHICH STOPS GAME
0260 *
0261 *   WAIT TWAIT FRAMES
0262 0003 007F 0003              CLA
0263 0007 002F 0004              LDX      7
0264 000F 004C 0005              TCY      3
0265 001F 0027 0006              TAM                CLEAR STATE
0266           0007    WAITEND   EQU      $
0267 003F 002F 0007              LDX      7
0268 003E 0016 0008              CALLL    FRAME
     003D 00C0 0009
0269 003B 004C 0010              TCY      3
0270 0037 003E 0011              IMAC
0271 002F 0027 0012              TAM                INCREMENT STATE
0272 001E 002B 0013              LDX      6
0273 003C 004C 0014              TCY      3
0274 0039 0001 0015              ALEM               STATE < TWAIT
0275 0033 00BF 0016              BR       WAITEND
0276 *   NOW CHECK FOR A HIGH FRAME AT END
0277           0017    ENDY0     EQU      $
0278 0027 002F 0017              LDX      7
0279 000E 0016 0018              CALLL    FRAME
     001D 00C0 0019
0280 003A 0050 0020              YNEC     0
0281 0035 0096 0021              BR       CHKEND
0282 002B 0082 0022              BR       ENDY1
0283           0023    CHKEND    EQU      $
0284 0016 004F 0023              TCY      15
0285 002C 0001 0024              ALEM
0286 0018 00A7 0025              BR       ENDY0
0287 0030 001A 0026              BL       CEASE     IF HLH DETECTED
     0021 0080 0027                                 'CEASE'
0288 *
0289 0002 0016 0028    ENDY1     CALLL    FRAME
     0005 00C0 0029
0290 000B 0050 0030              YNEC     0
0291 0017 00A7 0031              BR       ENDY0
0292 002E 0016 0032    ENDY2     CALLL    FRAME
     001C 00C0 0033
0293 0038 0050 0034              YNEC     0
0294 0031 0082 0035              BR       ENDY1
0295 0023 0016 0036    ENDY3     CALLL    FRAME
     0006 00C0 0037
0296 000D 0050 0038              YNEC     0
0297 001B 00AE 0039              BR       ENDY2
0298 0036 0016 0040    ENDY4     CALLL    FRAME
```

```
          002D 00C0 0041
0299 001A 0050 0042                  YNEC      0
0300 0034 00A3 0043                  BR        ENDY3
0301 *
0302 *  5 CONSECUTIVE FRAMES OF 0 ZCR - END OF WORD DETECTED
0303 *  HIGH-LOW WORD RECOGNIZED
0304 *
0305           0044   HIGHLOW        EQU       $       'SHOOT' OR 'FIRE'
0306 0029 0048 0044                  TCY       1
0307 0012 0023 0045                  TYA
0308 0024 000A 0046                  TDO               ISSUE KEY
0309 0008 0042 0047                  TCY       4
0310 0011 0027 0048                  TAM
                                                       STORE IN
                                                       MEMORY
0311 0022 0010 0049                  BL        SILENCE0
     0004 0080 0050
0312                         PAGE
0313           0001   LOWLOW         EQU       $       'RIGHT' OR 'GO'
0314 0000 0044 0001                  TCY       2
0315 0001 0023 0002                  TYA
0316 0003 000A 0003                  TDO               ISSUE KEY
0317 0007 0042 0004                  TCY       4
0318 000F 0027 0005                  TAM               STORE KEY
0319 001F 0010 0006                  BL        SILENCE0
     003F 0080 0007
0320                         PAGE
0321           0001   LOWHIGH        EQU       $       'LEFT' OR 'REVERSE'
0322 0000 0016 0001   ENDLH0         CALLL     FRAME
     0001 00C0 0002
0323 0003 0050 0003                  YNEC      0
0324 0007 0080 0004                  BR        ENDLH0
0325 000F 0016 0005   ENDLH1         CALLL     FRAME
     001F 00C0 0006
0326 003F 0050 0007                  YNEC      0
0327 003E 0080 0008                  BR        ENDLH0
0328 003D 0016 0009   ENDLH2         CALLL     FRAME
     003B 00C0 0010
0329 0037 0050 0011                  YNEC      0
0330 002F 003F 0012                  BR        ENDLH1
0331 001E 0016 0013   ENDLH3         CALLL     FRAME
     003C 00C0 0014
0332 0039 0050 0015                  YNEC      0
0333 0033 00BD 0016                  BR        ENDLH2
0334 0027 0016 0017   ENDLH4         CALLL     FRAME
     000E 00C0 0018
0335 001D 0050 0019                  YNEC      0
0336 003A 009E 0020                  BR        ENDLH3
0337 *  5 CONSECUTIVE FRAMES OF 0 ZCR
0338 0035 004C 0021                  TCY       3
0339 002B 0023 0022                  TYA
0340 0016 000A 0023                  TDO               ISSUE KEY
0341 002C 0042 0024                  TCY       4
0342 0018 0027 0025                  TAM               STORE KEY
0343 0030 0010 0026                  BL        SILENCE0
     0021 0080 0027
0344                         PAGE
0345           0001   CEASE          EQU       $
0346 0000 0016 0001   ENDR0          CALLL     FRAME
     0001 00C0 0002
0347 0003 0050 0003                  YNEC      0
0348 0007 0080 0004                  BR        ENDR0
0349 000F 0016 0005   ENDR1          CALLL     FRAME
     001F 00C0 0006
```

```
0350 003F 0050 0007            YNEC    0
0351 003E 0080 0008            BR      ENDR0
0352 003D 0016 0009  ENDR2     CALLL   FRAME
     003B 00C0 0010
0353 0037 0050 0011            YNEC    0
0354 002F 008F 0012            BR      ENDR1
0355 001E 0016 0013  ENDR3     CALLL   FRAME
     003C 00C0 0014
0356 0039 0050 0015            YNEC    0
0357 0033 00BD 0016            BR      ENDR2
0358 0027 0016 0017  ENDR4     CALLL   FRAME
     000E 00C0 0018
0359 001D 0050 0019            YNEC    0
0360 003A 009E 0020            BR      ENDR3
0361 0035 007F 0021            CLA
0362 002B 000A 0022            TDO             ISSUE KEY
0363 0016 0042 0023            TCY     4
0364 002C 0027 0024            TAM
0365 0018 0010 0025            BL      SILENCE0
     0030 0080 0026
0366                    PAGE
0367           0001  FRAME     EQU     $
0368 0000 002F 0001            LDX     7
0369 0001 001E 0002            CALLL   DELAY
     0003 00C0 0003
0370 0007 001E 0004            CALLL   DELAY
     000F 00C0 0005
0371 * THIS SHOULD GIVE ABOUT 25 MSEC FRAME TIMING
0372 001F 004E 0006            TCY     7
0373 003F 000C 0007            RSTR
0374 003E 000D 0008            SETR
0375 * RESET COUNTER - LEAVE FREE RUNNING
0376 003D 0044 0009            TCY     2
0377 003B 0021 0010            TMA
0378 0037 0060 0011            TCMIY   0
0379 002F 0020 0012            TAY
0380 * PUTS INTERRUPT COUNT IN A AND Y, CLEARS PREVIOUS COUNT
0381 001E 000F 0013            RETN
0382                    PAGE
0383 0000 0040 0001  DELAY     TCY     0
0384 0001 0005 0002  GO        IYC
0385 0003 00BE 0003            BR      DONE
0386 0007 007F 0004            CLA
0387 000F 0070 0005  LOOP      IAC
0388 001F 0081 0006            BR      GO
0389 003F 008F 0007            BR      LOOP
0390 003E 000F 0008  DONE      RETN
0391 003D 00C0 0009  LDELAY    CALL    DELAY
0392 003B 00C0 0010            CALL    DELAY
0393 0037 00C0 0011            CALL    DELAY
0394 002F 00C0 0012            CALL    DELAY
0395 001E 00C0 0013            CALL    DELAY
0396 003C 00C0 0014            CALL    DELAY
0397 0039 00C0 0015            CALL    DELAY
0398 0033 00C0 0016            CALL    DELAY
0399 0027 00C0 0017            CALL    DELAY
0400 000E 00C0 0018            CALL    DELAY
0401 001D 00C0 0019            CALL    DELAY
0402 003A 00C0 0020            CALL    DELAY
0403 0035 00C0 0021            CALL    DELAY
0404 002B 00C0 0022            CALL    DELAY
0405 0016 00C0 0023            CALL    DELAY
0406 002C 00C0 0024            CALL    DELAY
```

```
0407  0013  00C0  0025         CALL      DELAY
0408  0030  00C0  0026         CALL      DELAY
0409  0021  00C0  0027         CALL      DELAY
0410  0002  00C0  0028         CALL      DELAY
0411  0005  000F  0029       . RETN
0412                            END
```

FIG. 6 illustrates an alternative embodiment of the present invention in which the output of microphone 10 is connected to an amplifier 80. The output of amplifier 80 is connected to a filter bank 82 of narrow bandpass filters 84, 86, 88 and 90 spaced across the frequency spectrum to monitor the amount of energy in certain preselected frequency ranges versus time. Each filter has its output connected to a peak detector 92, 94, 96, and 98 the output of which is connected to an input line 100, 102, 104 and 106 of microprocessor 14. Once it receives and input signal from the peak detectors, microprocessor 14 initiates execution of a recognition program. That program operates substantially as described above to recognize the voice command with the exception that the frequency level of each frame of the input signal is determined based on the output of the peak detectors. The input to microprocessor 14 from the peak detectors in each frame is a "x" bit digital word having one bit thereof corresponding to the digital output of each detector. The frequency level of the frame is discriminated between "x" levels depending upon which of the positions of the digital word is non-zero. Thus in FIG. 6, microprocessor 14 can distinguish four frequency levels by determining which of detectors 82-86 has a non-zero output and can identify, assuming each voice command is partitioned into "x" components, a vocabulary consisting of $4^x$ voice commands.

In summary, a voice control system has been disclosed to control execution of a game program operating in real time in a computer. Voice commands are received at a microphone having the output thereof connected to a clipping circuit. In an alternative embodiment the microphone output is connected to a filter bank having narrow bandpass filters each of which having its output connected to a peak detector. The output of the circuit (in the alternative embodiment, the peak detectors) is connected to a microprocessor which interrupts execution of the game program by a host microprocessor on detecting voice input and resumes game program execution only after it has recognized the voice input and issued an appropriate joystick command. Because game action is suspended during the entire voice input and recognition interval, the handicaps associated with a long speech input interval are effectively eliminated.

Although the preferred embodiment has been described in detail, it should be understood that various changes, substitutions and alterations could be made therein without departing from the spirit and scope of the invention as defined by the appended claims.

I claim:

1. Apparatus for voice control of program execution in a computer in which a program is being instituted, said apparatus comprising:
   operator input means for receiving spoken speech from an operator in the form of an audible voice command affecting the operation of the computer program and generating an input analog speech signal representative of the voice command;
   signal conditioning means for receiving the input analog speech signal from said operator input means and providing word-discrimination information as an output based upon the zero-crossing rate of the input analog speech signal, said signal conditioning means being effective to divide the input analog speech signal into a plurality of discrete speech signal portions and to produce a waveform sequence for each speech signal portion alternating between plus and minus polarity signs to define a zero-crossing signal from which a zero-crossing count can be obtained;
   event counter means operably associated with the output of said signal conditioning means for detecting signal transitions in the waveform sequences between plus and minus polarity signs and maintaining a zero-crossing count of each detected polarity transition in the waveform sequences corresponding to each of the speech signal portions as provided by said signal conditioning means;
   memory means storing a plurality of reference templates of digital speech data respectively respresentative of individual words comprising a vocabulary of voice commands each of said reference templates being defined by a plurality of binary segments of one bit each having a logic state of alternative high and low levels corresponding to respective thresholds related to high and low zero-crossing counts;
   processing means operably connected to said event counter means and said memory means, said processing means being responsive to the output of said event counter means to interrupt the execution of the computer program upon detection of a predetermined condition relative to the zero-crossing count maintained by said event counter means and including comparator means for comparing the zero-crossing count attributable to each speech signal portion of the input analog speech signal as obtained by said event counter means with said plurality of reference templates stored in said memory means to determine the particular reference template which has the same sequence of logic states assigned to the one-bit binary segments for portions of the input analog speech signal as are reflected by the zero-crossing count of such portions of the input analog speech signal as a recognition of the particular voice command provided by the spoken speech of the operator;
   said processing means further including means to execute the recognized voice command as represented by said particular reference template during the interruption of the execution of the program; and
   means responsive to the execution of the recognized voice command by said executing means for resuming execution of said program being run in the computer.

2. Apparatus as set forth in claim 1, wherein said processing means further includes
   means for sampling said zero-crossing signal as produced by said signal conditioning means to detect the presence of non-zero frames of speech data included in said zero-crossing signal; and
   said processing means being responsive to the detection of a predetermined number of consecutive non-zero frames of speech data by said sampling means as said predetermined condition for interrupting the execution of the computer program.

3. Apparatus as set forth in claim 2, wherein said sampling means is effective for sampling said zero-crossing signal at a first predetermined number of pre-selected time intervals to determine a frequency content for each of said time intervals equal to the number of zero-crossings occuring in the time interval; and said processing means further including means for discriminating the frequency content of each of said time intervals between first and second discrete levels corresponding to high and low logic states based upon the respective numbers of zero-crossings, means for determining the frequency level of a first portion of the voice command as one of the first and second discrete levels depending upon the frequency levels of said time intervals, and means for causing said sampling means and said discriminating means to repeat sampling of said zero-crossing signal and discrimination of the frequency content for a second predetermined number of time intervals until the end of the zero-crossing signal is detected;

said frequency level-determining means being effective for determining the frequency level of a second portion of the voice command as one of the first and second discrete levels depending upon the frequency levels of said second number of time intervals; and said processing means being effective to compare the frequency levels of said first and second portions of the voice command with said plurality of reference templates as stored in said memory means to identify which voice command was spoken by the operator for reception by said operator input means.

4. Apparatus as set forth in claim 3, wherein said discriminating means comprises means for comparing the frequency content of each of said time intervals with a pre-selected threshold to detect a high frequency level when the number of zero-crossings in a respective time interval exceeds said threshold and to detect a low frequency level when the number of zero-crossings is equal to or less than said threshold.

5. Apparatus as set forth in claim 4, wherein said processing means includes speech sensing means for detecting word-discrimination information form said signal conditioning means indicative of a voice command, and further including means responsive to said sensing means to delay interruption of the execution of the program being run by the computer for a predetermined time after said sensing means has detected word-discrimination information from said signal conditioning means indicative of a voice command.

6. Apparatus as set forth in claim 5, further including display means operably coupled to said processing means for displaying the results of the program being run by the computer, said display means being responsive to the execution of the recognized voice command by said executing means for displaying the effect of the executed voice command.

* * * * *